(12) United States Patent
Bokhary

(10) Patent No.: US 9,183,731 B1
(45) Date of Patent: Nov. 10, 2015

(54) EMERGENCY DETECTION AND ALERT DEVICE AND SYSTEM UTILIZING A MOBILE COMMUNICATION DEVICE

(71) Applicant: UMM AL-QURA UNIVERSITY, Makkah (SA)

(72) Inventor: Salma Yahya I Bokhary, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 21 days.

(21) Appl. No.: 14/279,238

(22) Filed: May 15, 2014

(51) Int. Cl.
G08B 1/08 (2006.01)
G08B 25/01 (2006.01)
G08B 25/10 (2006.01)
H04W 4/22 (2009.01)

(52) U.S. Cl.
CPC .............. G08B 25/016 (2013.01); G08B 25/10 (2013.01); H04W 4/22 (2013.01)

(58) Field of Classification Search
CPC ..................... H04M 1/72536; H04M 1/72541; H04M 1/72552; H04M 1/725; H04M 11/00; H04M 11/04; G08B 1/08; G08B 21/14; G08B 21/16; G08B 21/0269; G08B 21/0277; G08B 25/016; G08B 25/10
USPC .......... 340/539.1, 539.11, 539.13, 541, 573.1, 340/825.49; 455/404.1, 404.2, 456.1, 456.2
See application file for complete search history.

(56) References Cited

U.S. PATENT DOCUMENTS 5,568,535 A 10/1996 Sheffer et al.
7,528,732 B2 5/2009 Tajima et al.
8,013,734 B2 * 9/2011 Saigh et al. .............. 340/539.13
8,538,374 B1 * 9/2013 Haimo et al. .............. 455/404.2
8,610,587 B2 12/2013 Tropper
8,768,294 B2 * 7/2014 Reitnour et al. ........... 455/404.2

(Continued)

FOREIGN PATENT DOCUMENTS

CN 202178793 U 3/2012
JP 2003-173484 6/2003

(Continued)

OTHER PUBLICATIONS

Nest, *Nest Protect: Smoke + Carbon Monoxide (CO) Alarm*, Apple Store, retrieved on Feb. 24, 2014 (5 pgs.).

(Continued)

*Primary Examiner* — Hung T Nguyen
(74) *Attorney, Agent, or Firm* — Richard C. Litman (57) ABSTRACT

A wireless emergency detection and alert system includes a primary wireless emergency communication device having an emergency detection and alert application to determine the presence of an emergency condition, based on information received indicating an emergency condition from a sensor associated with the primary wireless emergency communication device, and to execute at least one of a visual or sensual alarm of the at least one detected emergency condition by the primary wireless emergency communication device and to wirelessly transmit an alert signal and an alert message of the detected emergency condition to at least one secondary communication device, the alert message including at least to one of an SMS message, a text type message or a voicemail. The primary wireless emergency communication device also generates an audible alert, a visual alert, or a tactile alert, an alert message or combination thereof, in response to the detection of an emergency condition.

14 Claims, 5 Drawing Sheets

(56) References Cited

U.S. PATENT DOCUMENTS

| | | |
|---|---|---|
| 2003/0104800 A1 | 6/2003 | Zak |
| 2003/0230030 A1 | 12/2003 | Santa Cruz et al. |
| 2008/0064339 A1* | 3/2008 | Cavalier .................. 455/66.1 |
| 2008/0096521 A1* | 4/2008 | Boling et al. ............. 455/404.2 |
| 2012/0282884 A1* | 11/2012 | Sun ........................... 455/404.2 |
| 2013/0065640 A1 | 3/2013 | Song et al. |
| 2013/0157609 A1 | 6/2013 | Vainik et al. |
| 2013/0183924 A1* | 7/2013 | Saigh et al. ............... 455/404.2 |

FOREIGN PATENT DOCUMENTS

| | | |
|---|---|---|
| JP | 2007-142835 | 6/2007 |
| KR | 10-2006-0028253 | 3/2006 |
| WO | 01/04853 | 1/2001 |

OTHER PUBLICATIONS

"Cellphone Smoke Detector," http://www.newscientist.com/blog/invention/2006/09/cellphone-smoke-detector.html (Accessed Nov. 29, 2013) (2 pgs.).

* cited by examiner

EMERGENCY DETECTION AND ALERT DEVICE AND SYSTEM UTILIZING A MOBILE COMMUNICATION DEVICE

BACKGROUND OF THE INVENTION

1. Field of the Invention

The present invention relates to a wireless emergency detection and alert system including at least one primary wireless emergency communication device to determine the presence of an emergency condition, based on information received from at least one sensor, and to execute a visual or sensual alarm of the detected emergency condition and to wirelessly transmit an alert signal and an alert message of the detected emergency condition to at least one secondary communication device.

2. Description of the Related Art

Sensors, such as carbon monoxide detectors and smoke detectors, are typically installed in homes, residential buildings, and commercial buildings, such as shopping malls, as a way to detect emergencies such as carbon monoxide leaks and smoke/fires, for example. Sensors, such as standalone carbon monoxide detectors and smoke detectors, are typically run off 9-volt battery or 120-volt house current and are activated automatically by carbon monoxide, smoke, or manually by someone who discovers the emergency and pulls the fire alarm attached to a structure, such as a wall. Once the sensor is activated, it emits at least one visual cue, such as flashing lights, audio sounds, and even olfactory cues to alert people in the vicinity of the emergency, so that they can escape early and unharmed. These cues also enable the people in the area of the emergency to call emergency personnel and alert them to the situation.

Such detectors, associated with such sensors, can also be adapted to automatically send a wireless signal, such as a text message to a small, limited number of predetermined phone numbers. Such sensors typically are associated with an access point or central device. However, if the access point or central device becomes damaged or inoperable, the system likely will not be able to perform emergency detection and notification.

Thus, an emergency detection and alert system for a mobile communication device addressing the aforementioned problems is desired.

SUMMARY OF THE INVENTION

Embodiments of an emergency detection and alert device utilize wireless communication of an emergency condition and include at least one sensor to detect at least one corresponding emergency condition and to generate one or more information signals corresponding to a detected at least one emergency condition. The emergency detection and alert device includes a memory adapted to store a mobile application having a plurality of processor-executable instructions to determine the presence of at least one emergency condition and to generate at least one alert signal and at least one alert message to wirelessly communicate to at least one secondary communication device of the determined at least one emergency condition. The emergency detection and alert device also includes a processor to execute the processor-executable instructions of the mobile application to determine the presence of at least one emergency condition based on the generated one or more information signals from the at least one sensor, and, when the at least one emergency condition is determined to be present, to generate the at least one alert signal and the at least one alert message corresponding to the detected at least one emergency condition, and to initiate communication of the generated at least one alert signal and the at least one alert message to the at least one secondary communication device via a wireless communication.

Also, embodiments of a wireless emergency detection and alert system are provided that include one or more mobile communication devices including at least one emergency detection and alert device, such as at least one primary wireless emergency communication device (PWECD) having a mobile application (mobile app), such as an emergency detection and alert application, to determine the presence of an emergency condition, based on information received indicating an emergency condition from at least one sensor associated with the PWECD, and to execute at least one of a visual or sensual alarm of the at least one detected emergency condition by the PWECD and to wirelessly transmit an alert signal and an alert message of the detected at least one emergency condition to at least one secondary communication device (SCD), the alert message including at least one of a short message service (SMS) message, a Multimedia Messaging Service (MMS) message, a tweet, a text type message, a voicemail, or a combination thereof, for example.

Embodiments of the PWECD and the at least one SCD can include a smartphone or an emergency condition detector, such as a fire detector, a fire type detector, a smoke detector, a gas detector, a carbon monoxide detector or a radiation detector, having an a processor and memory, and a mobile app, such as an emergency detection and alert application, for execution on the PWECD or SCD, when functioning as a PWECD.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PERFUMED EMBODIMENTS

Figure 1A:
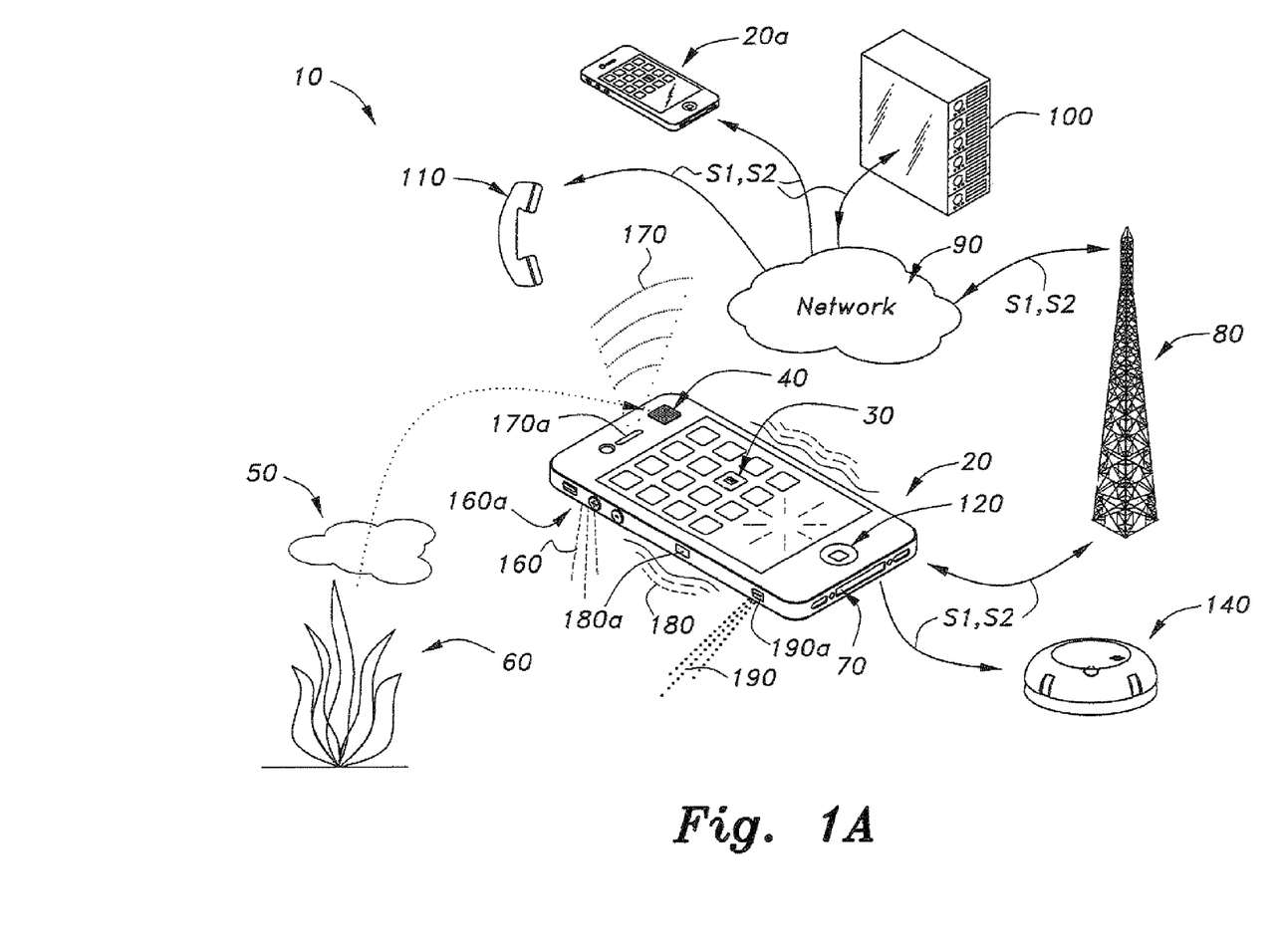
FIG. 1A is an environmental schematic illustration of an embodiment of an emergency detection and alert system including a PWECD having at least one associated sensor to detect at least one emergency condition and a plurality of SCD(s), according to the present invention.

Referring to FIG. 1A, there is illustrated an embodiment of an emergency detection and alert system 10. The emergency detection and alert system 10 includes one or more mobile communication devices, such as at least one PWECD, such as a smartphone 20, associated with at least one sensor 40 to detect at least one emergency condition, such emergency conditions include, but are not limited to, a fire or a type of fire (e.g. an electrical fire, a flammable liquid fire or a flammable material fire, etc.), smoke, gas, temperature, carbon monoxide or radiation, for example. The emergency detection and alert system 10 also includes at least one SCD, such as a smartphone 20a, a server 100, a landline 110 or an emergency condition detector 140, for example.

The PWECD, such as the smartphone 20, also includes a mobile app 30, such as an emergency detection and alert application, to determine the presence of at least one emergency condition, such as smoke 50 or a fire 60, based on an input information signal from the at least one sensor 40 corresponding to one or more detected conditions indicating at least one emergency condition that is provided to the PWECD, such as the smartphone 20.

The PWECD, such as the smartphone 20, based on the received input information signal from the at least one associated sensor 40 indicating at least one detected emergency condition, initiates generation of one or more primary alert signals by the PWECD to one or more primary alert devices associated with the PWECD, such as the smartphone 20, to generate by the one or more primary alert devices of the PWECD an alert or alarm indicating to one or more individuals in proximity to the PWECD, such as in proximity to the smartphone 20, the presence of at least one emergency condition at a location of or in proximity to the PWECD.

The primary alert signals generated by the PWECD provided to the one or more primary alert devices associated with the PWECD, such as generated by the smartphone 20, when at least one detected emergency condition is present, can include, but are not limited to, primary alert signals to generate a light, a sensual or an audible alert or alarm, for example. Such primary alert devices associated with the PWECD can include, but are not limited to, one or more of a light source 160a to emit a light 160, such as to emit a laser light, a speaker 170a to emit a sound 170, a tactile vibration generator 180a, such as a piezoelectric vibration generator, to generate a vibration 180, or a spray device 190a to emit an olfactory alert 190, such as to alert a visually impaired person, as can include a distinctive odor or a perfume smell, or can include a combination of these or other primary alert devices, for example, to alert of the at least one detected emergency condition.

The PWECD, such as the smartphone 20, also, when at least one detected emergency condition is present, wirelessly transmits directly or through a network 90, such as to a transmission device, such as a cell tower 80, for example, an alert signal S1 and an alert message S2 of the detected at least one emergency condition to one or more SCDs, such as another wireless phone, such as the smartphone 20a, the server 100 of a communication system, the landline 110, or the emergency condition detector 140, for example, and the type or number of SCDs should not be construed in a limiting sense.

The PWECD, such as the smartphone 20, can operate over an existing wireless telecommunications network, such as the network 90, or wirelessly directly communicate with the one or more SCD(s), such as the smartphone 20a. The alert signal(s) S1 and alert message(s) S2 can be sent via wireless communications, such as Global System of Mobile Communications (GSM), Code Division Multiple Access (CDMA) and General Packet Radio Service (GPRS), to Third Generation (3G) networks such as Wideband Code Division Multiple Access (W-CDMA), Enhanced Data rates for GSM Evolution (EDGE), Fourth Generation (4G), and other wireless type services, for example, and should not be construed in a limiting sense.

Figure 2:
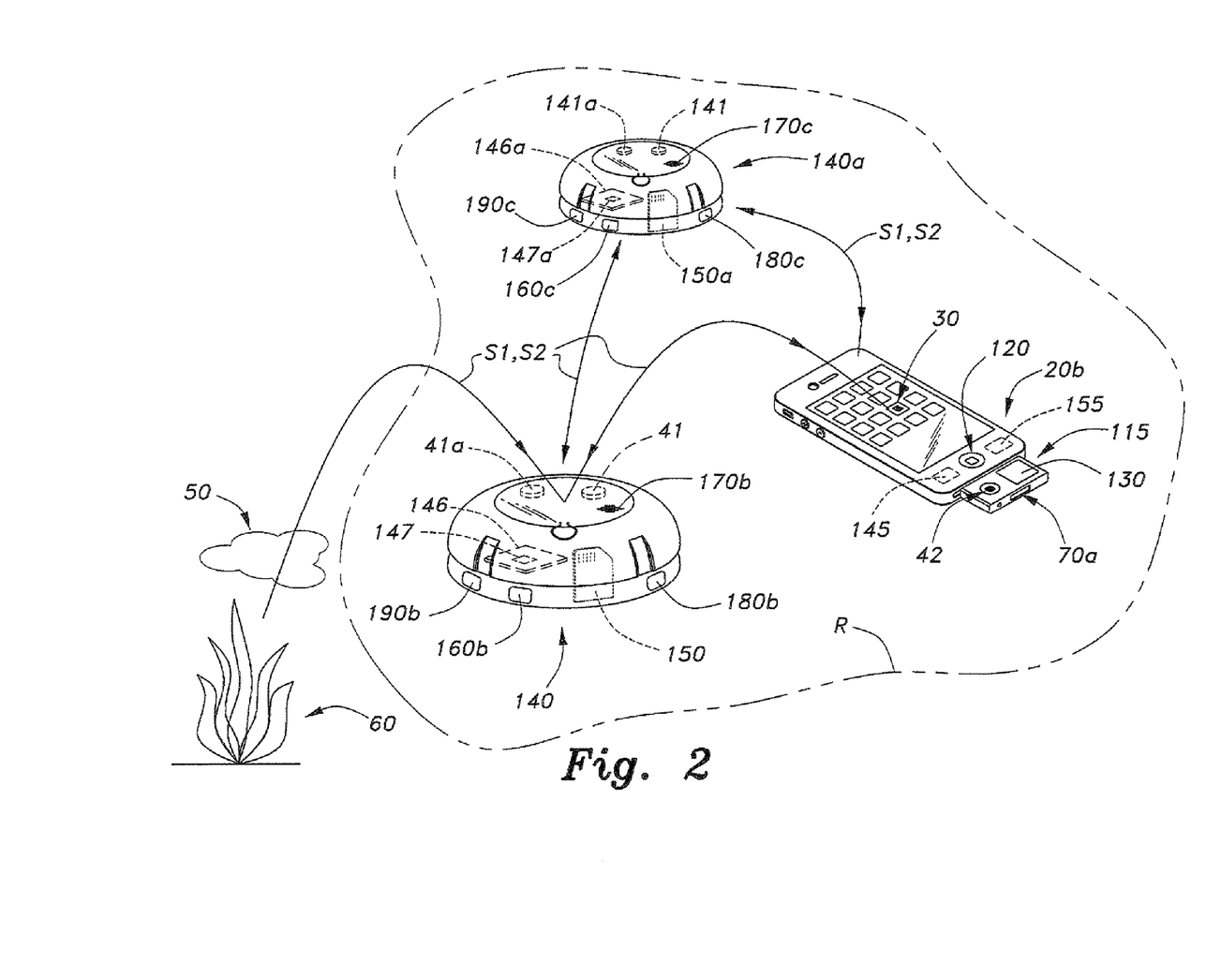
FIG. 2 is an environmental schematic view of an embodiment of an emergency detection and alert system including a PWECD having at least one associated sensor to detect at least one emergency condition and a plurality of SCD(s) within a predetermined designated distance, location or area of the PWECD to which are transmitted an alert signal and an alert message, according to the present invention.

The PWECD, such as the smartphone 20, can include any of various wireless communication devices, such as a smartphone, as described, or an emergency condition detector, such as the emergency condition detector 140 having at least one sensor, such as sensors 41 and 41a, illustrated in FIG. 2, such as to detect a fire, smoke, gas, temperature, carbon monoxide or radiation, for example, having the mobile app 30, such as an emergency detection and alert application, for execution on the PWECD, such as the smartphone 20 or the emergency condition detector 140, when functioning as the PWECD.

The alert signal S1 transmitted by the PWECD; such as the smartphone 20, can correspond to and enable at least one of one or more SCDs 20a, 100, 110, and 140 to generate one or more of an audible, visual or sensual alert or alarm, from one or more primary alert devices associated or in communication with a corresponding SCD, similar to the alerts generated by the one or more primary alert devices. Such primary alert devices associated with one or more SCDs can be the same or similar to those described associated with the PWECD and can similarly include one or more of, but are not limited to, a light source, such as the light source 160a to emit the light 160, as to emit a laser light, a speaker, such as the speaker 170a to emit the sound 170, a tactile vibration sensor, such as the tactile vibration generator 180a, such as a piezoelectric vibration generator, to generate the vibration 180, or a spray device, such as the spray device 190a to emit an olfactory alert 190, such as to alert a visually impaired person, as can include a distinctive odor or a perfume smell, or can include a combination of these or other primary alert devices, for example, to alert of the at least one detected emergency condition.

The smartphone 20a and the smartphone 20b (FIG. 2) can also include the light source 160a, the speaker 170a, the tactile vibration generator 180a, the spray device 190a, or a combination thereof, to generate and emit the corresponding alert or alarm, for example. Also, the alert message S2, transmitted by the PWECD, such as the smartphone 20, can correspond to and enable at least one of SCDs 20a, 100, 110, and 140 to generate a message corresponding to the alert message S2 of the detected at least one emergency condition. In this regard, the alert message S2 can include at least one of a short message service (SMS) message, a Multimedia Messaging Service (MMS) message, a text type message, e.g. a "tweet," a voicemail, or a combination thereof, for example, and should not be construed in a limiting sense. Also, the alert message S2 can also be sent through social media such as Facebook® or Twitter®, for example.

The alert message S2 can also include the location, such as the Global Positioning Satellite (GPS) coordinates, of the emergency condition. Additionally, the alert message S2 that is sent to the SCD(s), can also contain information about the PWECD, such as identification of the sender, a location of the detected at least one emergency condition, the time the message was sent, and the type of emergency condition, such as whether the at least one detected emergency condition is a fire or a type of fire, a gas leak, carbon monoxide, abnormal temperature, or a radiation leak, for example.

An SCD can include, but is not limited to, a wireless phone, such as the smartphone 20a, the server 100 of a communication system, the landline 110, or the emergency condition detector 140, such as a fire, smoke, gas, carbon monoxide or radiation detector. An SCD can also function as a PWECD and, in this regard, can include a mobile app similar to the mobile app 30, such as an emergency detection and alert application, for execution on the SCD(s) executing the same or similar functions to the mobile app 30, such as an emergency detection and alert application, included on the PWECD. Further, SCD(s) not typically functioning as a PWECD can include, for example, a conventional landline, a wireless phone or a pager to which the PWECD is preprogrammed to send at least one of the alert signal or the alert message to alert of at least one detected emergency condition.

Referring to FIGS. 1A and 2, the PWECD, such as the smartphone 20, as well as the smartphones 20a and 20b, and the emergency detector 140, when functioning as the PWECD, refers to the device that detects the at least one emergency condition, such as a gas leak, smoke, abnormally high temperatures, such as indicative of a fire, carbon monoxide, or a combination thereof, and emits the alert signal S1 and the alert message S2, as described. The SCD(s), when functioning as a SCD, are the one or more device(s) that receive(s) at least one of the alert signal S1 and alert message S2 from the PWECD in relation to the detected at least one emergency condition.

There can be various different sensors, such as ionization detectors, temperature detectors, gas detectors, fire detectors, fire type detectors, carbon monoxide detectors, radiation detectors and photoelectric detectors, or combinations thereof, for example, which can be used in connection or in conjunction with the PWECD, depending on the type of emergency condition to be detected or the particular use or application for example, and, as such, should not be construed in a limiting sense.

However, the SCD(s), such as the smartphone 20a (FIG. 1A) or the emergency condition detector 140 (FIG. 2), when associated with at least one sensor, such as sensors 40, 41, and 41a, to detect at least one emergency condition can also function as a PWECD, similar to the smartphone 20, as when the smartphone 20 is functioning as the PWECD, by receiving information detected from at least one associated sensor, such as the sensors 40, 41, and 41a, indicating at least one emergency condition, and, as the PWECD, wirelessly transmits the alert signal S1 and the alert message S2 of the detected at least one emergency condition to at least one SCD(s), such as the smartphone 20b when the smartphone 20b functions as an SCD, for example.

Figure 1B:
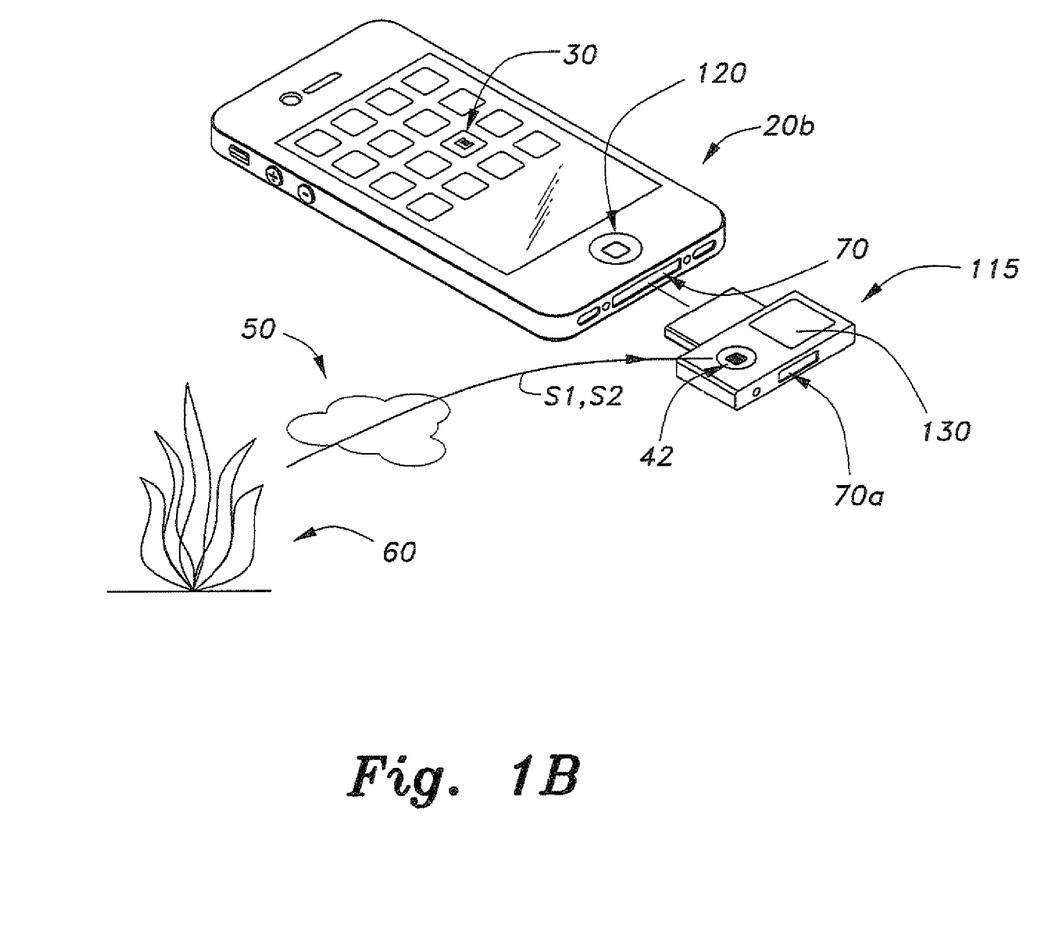
FIG. 1B is an environmental schematic view of embodiment of a PWECD adapted to be associated with an attachable sensor to detect at least one emergency condition, according to the present invention.

Referring to FIGS. 1A, 1B, and 2, the mobile app 30, such as an emergency detection and alert application, has processor-executable instructions, such as stored in a memory, such as a memory 155 included in the smartphone 20b as can also be included in the smartphones 20 and 20a, stored in a memory 147 in the emergency condition detector 140 and stored in a memory 147a in an emergency condition detector 140a, for example.

The processor-executable instructions, are executable by a processor, such as executable by a processor 145, included in the smartphone 20b as can also be included in the smartphones 20 and 20a, executable by a processor 146 included in the emergency condition detector 140 and executable by a processor 146a in the emergency condition detector 140a, providing programmable instructions to detect the at least one input information signal from the at least one associated sensor 40, 41, 41a, 42, 141, and 141a, such as corresponding to at least one detected emergency condition, as described.

The memory, such as memories 147, 147a and 155 and the processor, such as processors 145, 146 and 146a, can also be associated with a position tracking device, such as can send and receive signals as to a location of the PWECD as corresponding to a location of the at least one detected emergency condition, such as the location of the smartphone 20, when the smartphone 20 functions as the PWECD, for example.

The one or more emergency condition detectors, such as emergency condition detectors 140 and 140a, can also include a memory as can have stored thereon the mobile app 30, such as a subscriber identification module (SIM) type card, such as a SIM type card 150 associated with emergency condition detector 140 and a SIM type card 150a associated with emergency condition detector 140a. The SIM type cards 150 and 150a can provide processor-executable instructions related to detecting and alerting of at least one emergency condition, such as the processor-executable instructions included in the mobile app 30, to the corresponding processors 146 and 146a of the corresponding emergency condition detectors 140 and 140a, as well as can provide such processor-executable instructions to be stored in the corresponding memories 147 and 147a.

Also, the processor-executable instructions related to detecting and alerting of at least one emergency condition, such as included in the mobile app 30, can also be provided to a processor incorporated or associated with SIM type cards 150 and 150a, such as a microcontroller or a Microchip peripheral interface controller (PIC) microcontroller, as can receive, either directly or through the corresponding processors 146, 146a, input information signals corresponding to the detected at least one emergency condition from the associated sensors 41, 41a and 141, 141a and can generate at least one alert message and at least one alert signal to be transmitted to one or more SCDs.

When the corresponding emergency condition detector 140 or 140a functions as a PWECD, the SIM type cards 150 and 150a or the processors 146 and 146a, or both, are associated with a transmitter/receiver adapted to communicate wirelessly to transmit the at least one alert signal and the at least one alert message corresponding to the detected at least one emergency condition either directly or through a network, such as the network 90, such as by WiFi or Bluetooth®, for example, to a control unit, such as a processor, of one or more SCDs, such as the smartphone 20b when the smartphone 20b functions as a SCD.

Further, the SIM type cards, such as SIM type cards 150 and 150a, the memories 147 and 147a included in the emergency condition detectors 140 and 140a, and the memory 155 as can be included in the smartphones 20, 20a and 20b, can be used to store contact information for one or more individuals or emergency personnel, such as the fire department, other emergency contacts, and social media contacts, to contact in case of an emergency condition, such as a fire, gas leak or other type of emergency, as described, and to notify such individual(s) or emergency contact(s), in addition to providing the at least one alert signal and the at least one alert message, when a corresponding one or the smartphones 20, 20a and 20b or the emergency condition detectors 140 and 140a functions as a PWECD.

In addition to contacting emergency personnel, such as the fire department, and contacting other emergency and personal contacts, such as phone numbers, and social media contacts, the emergency condition detector, such as emergency condition detectors 140 and 140a, similar to the smart phones 20, 20 and 20b, can be adapted to generate and emit and one or more alerts or alarms by generating one or more primary alert signals.

For example, the emergency condition detectors 140 and 140a can include primary alert devices as can be the same or similar to those described associated with the smartphones 20, 20a, or 20b, when functioning as a PWECD or an SCD. Such primary alert devices to emit an alert or alarm can include, but are not limited to, one or more of light sources 160b and 160c to emit a light, such as a laser light, speakers 170*b* and 170*c* to emit a sound as an audible alert or alarm, tactile vibration generators 180*b* and 180*c* to generate a tactile alert or alarm, or spray devices 190*b* and 190*c* to emit an olfactory alert or alarm, such as emitting a distinctive odor or smell, such as to alert a visually impaired person, as can include a distinctive odor or a perfume smell, or can include a combination of these or other primary alert devices, for example, to alert of the at least one detected emergency condition, such as a fire or a type of fire, abnormally high temperatures, harmful gases, such as carbon monoxide, smoke, radiation, or a combination thereof, for example.

Further, it is to be understood that various suitable types of sensors, such as mentioned and described above, for example, can be used to detect the at least one emergency condition, as the type of sensor can depend on the type of emergency condition to be detected and, therefore, should not be construed in a limiting sense.

The at least one sensor 40 of the smartphone 20 (FIG. 1A) as can also be included in the smartphones 20*a* and 20*b*, the sensors 41 and 41*a* of the emergency condition detector 140 and the sensors 141 and 141*a* of the emergency condition detector 140*a* (FIG. 2), and the at least one sensor 42 of the removable external unit or module 115 connected to the smartphone 20*b* (FIGS. 1B and 2), is/are in communication with at least one corresponding processor, such as the processor 145 of the smartphones 20, 20*a* and 20*b*, the processor 146 or a processor associated with the SIM type card 150 of the emergency condition detector 140, or the processor 146*a* or a processor associated with the SIM type card 150*a* of the emergency condition detector 140*a*, for example.

Such communication can be by, for example, at least one flexible wire, cable, a connector unit, or a wireless transmitter/receiver associated with the control unit, such as a corresponding processor of the corresponding PWECD or SCD. As described, the one or more sensors 40, 41, 41*a*, 42, 141, 141*a* can be adapted to detect one or more emergency conditions, such as abnormally high temperatures, harmful gases, such as carbon monoxide, smoke, fire, fire type, radiation, or a combination thereof, for example, and communicate input information signals corresponding to the detected at least one emergency condition to a corresponding at least one processor of a PWECD or a SCD having the mobile app 30, such as an emergency detection and alert application, to determine the presence of at least one emergency condition based on the input information signals from the at least one sensor.

Also, the one or more emergency condition detectors, such as the emergency condition detector 140 and 140*a* as a corresponding PWECD or SCD can include any of suitable conventional smoke, gas, temperature, carbon monoxide or radiation detectors modified or adapted to include associated one or more sensors, processors, memories and receivers/transmitters to detect at least one emergency condition and to wirelessly communicate at least one alert signal and alert message, or receive at least one of an alert signal or an alert message, depending on the emergency condition detector 140 and 140*a* functioning as a PWECD or a SCD, for example.

If the at least one sensor, such as the at least one sensor 40, is integrated into the PWECD, such as the smartphone 20, 20*a* or 20*b*, the at least one sensor 40 can be activated to detect at least one emergency condition when the PWECD, such as the smartphone 20, 20*a* or 20*b* is activated through the use of an on/off button 120 or activated by use of a key pad command, for example, and can remain active to detect the at least one emergency condition so long as the PWECD, such as the smartphone 20, 20*a* or 20*b*, remains active or is in an on state so as to enable detection of at least one emergency condition, for example.

Referring to FIG. 1B, it is to be noted that the at least one sensor 42 can be provided as part of the external unit or module 115 that can be connected to the PWECD or SCD, such as the smartphone 20*b*, through various types of connections or connector units, such as a communications input 70, for example. The communications input 70 can be a universal serial bus (USB), any of the proprietary inputs utilized by a particular manufacturer of the PWECD, such as the smartphone 20*b*, or other suitable connector or connector unit. Through the communication input 70, the at least one sensor 42 is in communication by at least one flexible wire, cable, connector, connector unit, or a wireless transmitter/receiver with the control unit, such as a processor, of the PWECD or SCD, such as of the smartphone 20*b*, that can be adapted to detect abnormally high temperatures, harmful gases, such as carbon monoxide, smoke, fire, fire type, radiation, or a combination thereof, for example.

Additionally, the external unit or module 115 can include a status indicator 130 to determine if the at least one sensor 42 is receiving power from the connected PWECD or SCD, such as from the smartphone 20*b*, and a USB input 70*a*, or other suitable input, to which additional devices, units or modules can be connected for communication with the external unit or module 115 or with the connected PWECD or SCD. Such additional devices, units or modules can include those with one or more additional sensors, such as the at least one sensor 42 to detect various emergency conditions, for example. The external unit or module 115 can also have integrated therewith a memory, such as can include stored processor-executable instructions to detect and communicate at least one emergency condition and can include a processor to control operation of the external unit or module 115 and to execute such processor-executable instructions, for example.

The memory, such as memory 155 in smartphone 20*b* as can also be included in smartphones 20 and 20*a*, the memory 147 in emergency condition detector 140 and the memory 147*a* in emergency condition detector 140*a*, as well as a memory associated with the SIM type cards 150 and 150*a* and a memory as can be associated with the external unit or module 115 can be any suitable type of computer readable and programmable memory. Examples of computer readable media include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to memory or in place of memory include a hard disk device (HDD) and a magnetic tape (MT).

The control unit or controller/processor, such as the processors of the PWECD and the SCD(s) such as the processor 145 of the smartphones 20, 20*a* and 20*b*, the processor 146 or a processor associated with the SIM type card 150 of the emergency condition detector 140, the processor 146*a* or a processor associated with the SIM type card 150*a* of the emergency condition detector 140*a*, or a processor associated with the external unit or module 115, can be any suitable type of computer processor, such as a microprocessor, a microcontroller a microchip PIC microcontroller, a programmable logic controller (PLC), or an application-specification integrated circuit (ASIC), for example, and the mobile app 30 as can be stored in an associated memory provides processor-executable instructions to at least one processor associated with a corresponding PWECD or a corresponding SCD as can enable and can facilitate the calculations, determinations, data transmission or data reception, and the sending, receiving or generating of control signals, commands, alert signals, alert messages and/or primary alert signals in relation to detection of at least one emergency condition and alerting of the at least one detected emergency condition; as described.

It is to be understood that the control unit, controller/processor or processor, such as the processors of the PWECD and the SCD(s) such as the processor 145 of the smartphones 20, 20a and 20b, the processor 146 or a processor associated with the SIM type card 150 of the emergency condition detector 140, the processor 146a or a processor associated with the SIM type card 150a of the emergency condition detector 140a, or a processor associated with the external unit or module 115, can also be associated with a transmitter/receiver, as described, to communicate wirelessly, such as via WiFi and Bluetooth®, with the SCD(s) and with other notification devices, such as the server 100 and the landline 110, for example.

The control unit, such as the processors 145, 146 and 146a or the processors associated with the SIM type cards 150 and 150a or with the external unit or module 115, a position tracking device associated with a PWECD or an SCD to determine a location of the PWECD or SCD, or a corresponding location of the at least one detected emergency condition, such as a GPS device or GPS unit, the associated memories 155, 147 and 147a, and any associated computer readable media, such as associated with the SIM type cards 150 and 150a and the external unit or module 115, the one or more detectors or sensors of the PWSCD or the SCD, are in communication with one another by any suitable type of data bus, or by a wireless transmitter/receiver, as is well known in the art.

The controller/processor associated with a PWECD or a SCD, such as the processors 145, 146 and 146a, or a processor associated with the SIM type cards 150 and 150a or a processor associated with the external unit or module 115, can be powered by a system or device power source, such as a battery, for example, as can also power operations of a PWECD or operations of an SCD, such as can be the smartphones 20, 20a and 20b or the emergency condition detectors 140 and 140a, for example, depending on the functioning of the device as a PWECD or a SCD, as described, for example.

Such suitable power source, such as a battery, can also provide power to power operation of the sensors, such as the sensors 40, 41, 41a, 42, 141 and 141a, that detect the at least one emergency condition, and to power the primary alert devices of a corresponding PWECD and the primary alert devices of a corresponding SCD to generate and emit the corresponding alert or alarm of the at least one detected emergency condition, such as to power the corresponding light sources 160a, 160b and 160c as a primary alert device, the corresponding speakers 170a, 170b and 170c as a primary alert device, the corresponding tactile vibration generators 180a, 180b and 180c as a primary alert device, and the corresponding spray devices 190a, 190b and 190c as a primary alert device, and to power a transmitter/receiver of the corresponding PWECD or the corresponding SCD(s), for example, and should not be construed in a limiting sense.

Figure 3A:
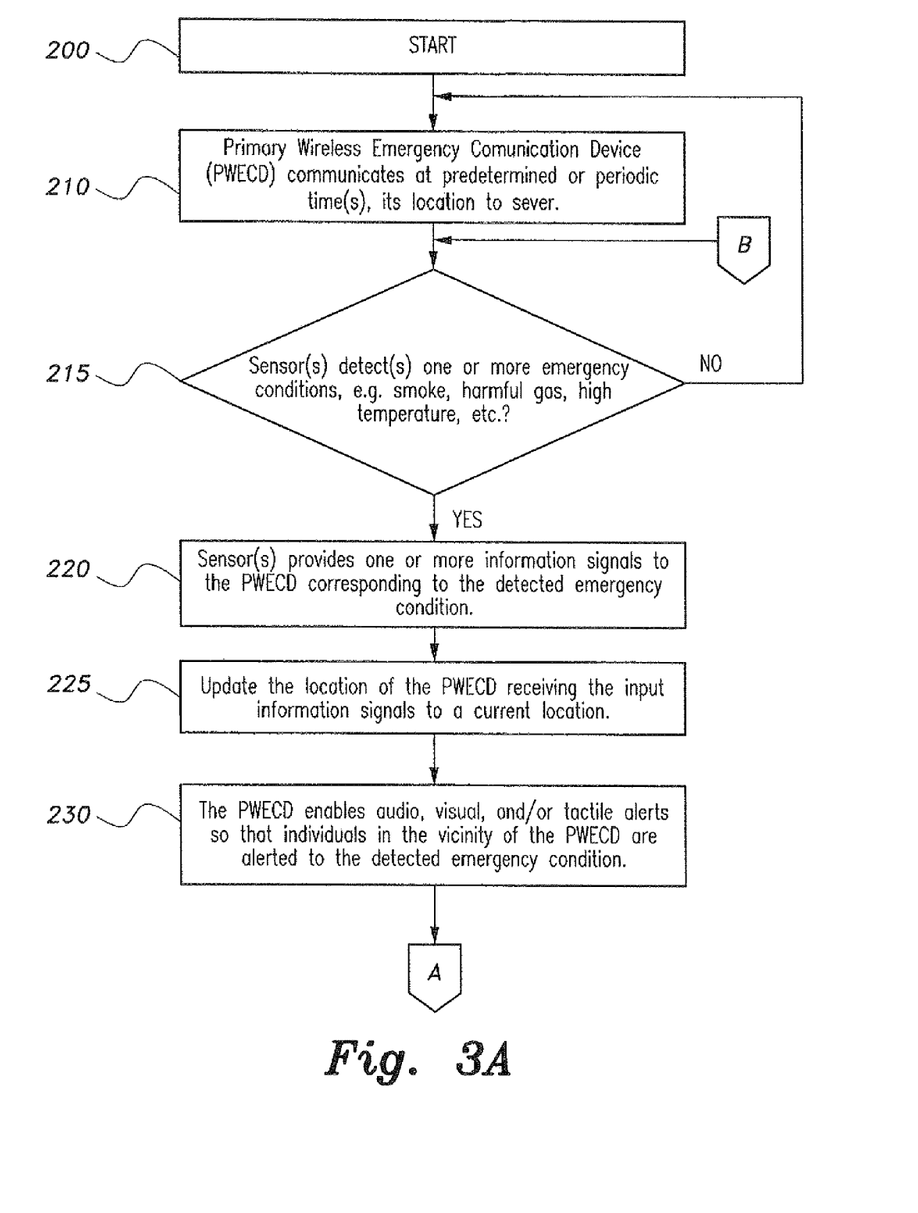
FIG. 3A is a flowchart illustrating process steps or instructions of an embodiment of a method for detecting and alerting an emergency condition, according to the present invention.
Figure 3B:
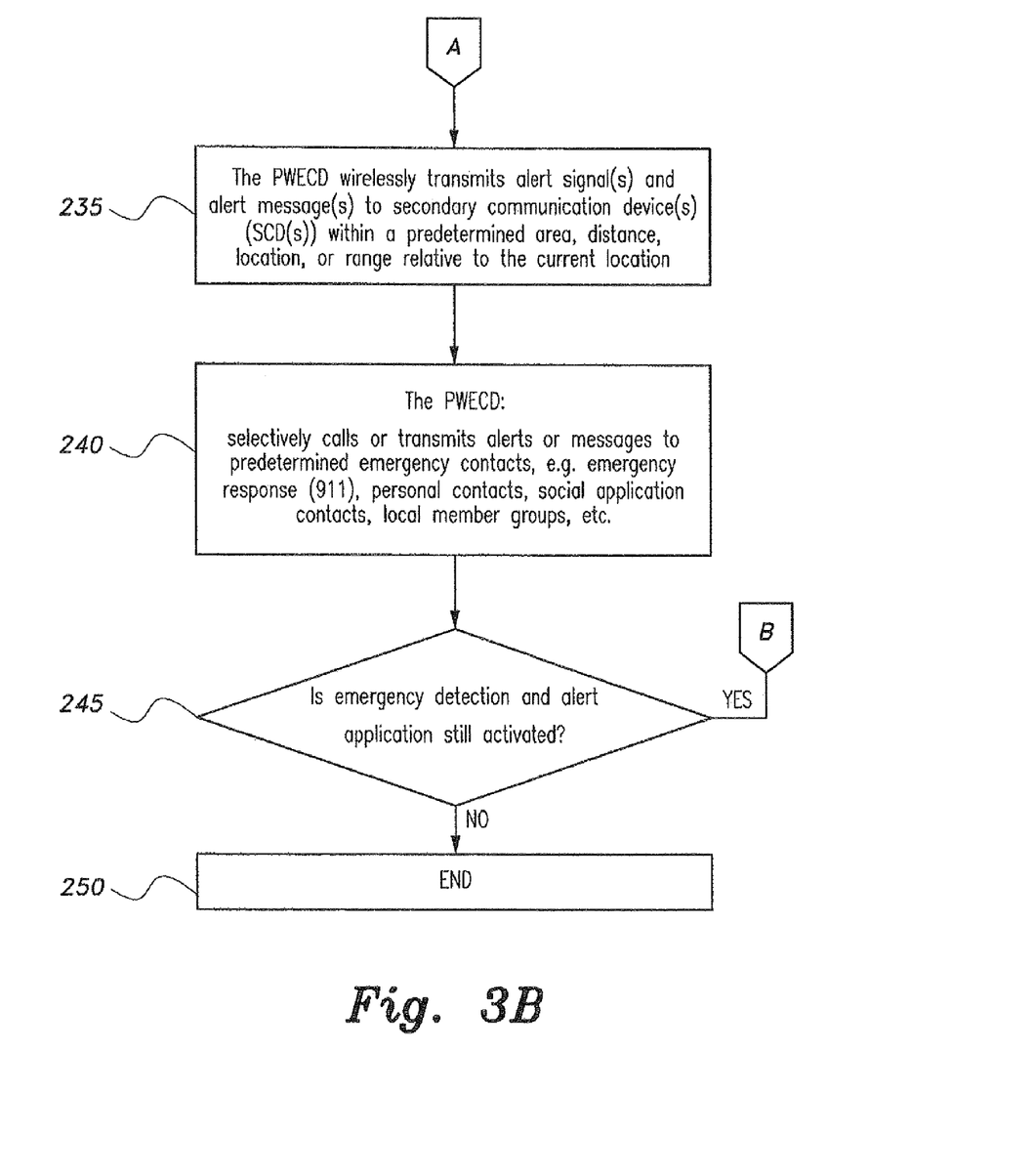
FIG. 3B is a flowchart continuing the method illustrated in FIG. 3A illustrating further process steps or instructions of an embodiment of a method for detecting and alerting an emergency condition, according to the present invention.

Referring now to FIGS. 3A and 3B, there are illustrated flowcharts of process steps or instructions of an embodiment of a method for detecting and alerting an emergency condition. The process starts at step 200. The process then proceeds to step 210 where the PWECD, such as the smartphone 20, communicates, at predetermined or periodic time(s), its location, such as to a server, so that the system, as well as individuals can be aware of the location of the PWECD. It is to be noted that the PWECD, such as the smartphone 20, can be programmed to be in relatively constant or periodic, or on demand, communication with a server, such as the server 100, so as to periodically, such as every thirty minutes, transmit its location to the server, for example.

However, depending on the battery life of a battery powering operation of the PWECD, such as the smartphone 20, an option of relatively constantly or periodically transmitting its location can be either turned off completely or set to only transmit its location once every two or three hours or on demand, for example, to extend the life of the battery of the PWECD, such as of the smartphone 20, for example.

Once the PWECD is active, at step 215, the at least one sensor constantly or substantially constantly, or at predetermined times or periodically, for example, monitors the surrounding environment in the location of the PWECD. If the at least one sensor of the PWECD does not detect at least one emergency condition, e.g. smoke, harmful gas, high temperature, fire, fire type or radiation, for example, the at least one sensor continues to monitor the environment in the location of the PWECD, and the process also returns to step 210.

If, however, the at least one sensor of the PWECD does detect at least one emergency condition, the process then proceeds to step 220 where the at least one sensor provides one or more information signals to the PWECD corresponding to the detected at least one emergency condition. The process then proceeds to step 225 where the PWECD updates its location to the current location of the PWECD so that the location of the detected at least one emergency condition is known and can also be transmitted to SCD(s) or other contact(s), for example, From step 225, the process proceeds to step 230 where the PWECD then enables audio, visual, and/or tactile alerts or alarms, such as by generating one or more primary alert signals to one or more primary alert devices, so that individuals in the vicinity of the PWECD are alerted to the detected at least one emergency condition.

From step 230 the process proceeds to step 235 where the PWECD then wirelessly communicates and transmits alert signal(s) and alert message(s) to SCD(s) within a predetermined area, distance, location, or range R (illustrated in FIG. 2), such as 10 meters, relative to the current location of the PWECD. The predetermined area, distance, location, or range R can also vary depending on various factors, such as the strength of the signal or the strength of the battery, for example. The SCDs within the predetermined area, distance, location, or range R can provide an alert of the detected presence of the at least one emergency condition.

Additionally, the predetermined area, distance, location, or range R can be increased or decreased depending on the type of PWECD, such as the smartphone 20 or the emergency condition detector 140 or 140a being used or functioning as the PWECD, for example. Then, at step 240, the PWECD also selectively calls or transmits alert signal(s) and alert message(s) to predetermined emergency contacts, such as stored in a memory of the PWECD, e.g. emergency response (911), personal contacts, social application contacts, or local member groups, etc. to provide an alert of the detected presence of the at least one emergency condition.

From step 240, once the at least one emergency condition has been reported, the process then proceeds to step 245 where it is determined whether the mobile app 30, such as an emergency detection and alert application, has been deactivated on the PWECD. If the mobile app 30 has been deactivated, such as by a command input by a user to the PWECD or the PWECD is turned off, for example, the process proceeds to step 250 to end. If however, the mobile app 30 is still active on the PWECD, the process returns to step 215 where the at least one sensor is or remains active to detect another at least one emergency condition.

If the at least one sensor of the PWECD does not detect at least one emergency condition, e.g. smoke, harmful gas, high temperature, fire, fire type or radiation, for example, the at least one sensor continues to monitor the environment in the location of the PWECD, and the process also returns to step 210 and the process will loop between step 210 and step 215. However, at step 215, if no new emergency condition is detected by the at least one sensor, the mobile app 30, such as an emergency detection and alert application 30, can be deactivated on the PWECD. If, however, the at least one sensor of the PWECD does detect at least one emergency condition, the process again then proceeds from step 215 to step 220 and continues as described.

It is to be understood that the present invention is not limited to the embodiments described above, but encompasses any and all embodiments within the scope of the following claims.

I claim:

1. An emergency detection and alert device utilizing wireless communication of an emergency condition, comprising:
   at least one sensor to detect at least one corresponding emergency condition and to generate one or more information signals corresponding to a detected at least one emergency condition;
   the at least one sensor is selected from the group consisting of an ionization detector, a temperature detector, a gas detector, a fire detector, a fire type detector, a carbon monoxide detector, a radiation detector and a photoelectric detector, or a combination thereof;
   a memory adapted to store a mobile application having a plurality of processor-executable instructions to determine the presence of at least one emergency condition and to generate multi alert signals and at least one alert message includes an identification of a sender, a location of the detected at least one emergency condition to wirelessly communicate to at least one secondary communication device of the determined at least one emergency condition;
   a processor to execute the processor-executable instructions of the mobile application to determine the presence of at least one emergency condition based on the generated one or more information signals from the at least one sensor, and, when the at least one emergency condition is determined to be present in a proximity of the emergency detection and alert device, to generate the multi alert signals and the at least one alert message includes an identification of a sender, a location of the detected corresponding to the detected at least one emergency condition, and to initiate communication of the generated multi alert signals and the at least one alert message includes an identification of a sender, a location of the detected at least one emergency condition to the at least one secondary communication device via a wireless communication; and
   at least one primary alert device responsive to the generated multi alert signals for producing a corresponding alerts based on primary multi alert signals;
   wherein the multi alert signals can include a flashing laser light, an audible, a tactile and an olfactory.

2. The emergency detection and alert device according to claim 1, wherein
   the emergency detection and alert device comprises at least one of a mobile communication device and an emergency condition detector, and
   the emergency condition detector is selected from the group consisting of an ionization detector, a temperature detector, a gas detector, a fire detector, a fire type detector, a carbon monoxide detector, a radiation detector and a photoelectric detector, or a combination thereof.

3. The emergency detection and alert device according to claim 1, wherein the emergency detection and alert device comprises:
   a primary wireless emergency communication device when detecting the presence of the at least one emergency condition and wirelessly communicating the generated at least one alert signal and the generated at least one alert message, and
   the emergency detection and alert device comprises a secondary communication device when receiving the generated at least one alert signal and the generated at least one alert message via wireless communication from another emergency detection and alert device.

4. The emergency detection and alert device according to claim 3, wherein the primary wireless emergency communication device comprises a smartphone.

5. The emergency detection and alert device according to claim 1, wherein the at least one alert message comprises at least one of a short message service (SMS) message, a Multimedia Messaging Service (MMS) message, a tweet, a text type message, a voicemail or a combination thereof.

6. The emergency detection and alert device according to claim 1, wherein the emergency detection and alert device wirelessly communicates the generated at least one alert signal and the generated at least one alert message to at least one secondary communication device located within a predetermined area, distance, location or range relative to a current location of the emergency detection and alert device.

7. The emergency detection and alert device according to claim 1, wherein the emergency detection and alert device, when the presence of at least one emergency condition is determined, wirelessly communicates, calls or transmits one or more of an alert signal or an alert message to one or more predetermined emergency contacts stored in the memory, the predetermined emergency contacts including one or more of an emergency response (911), one or more personal contacts, one or more phone numbers, one or more social application contacts or one or more local member groups.

8. An emergency detection and alert system utilizing wireless communication of an emergency condition, comprising:
   at least one primary wireless emergency communication device, the at least one primary wireless emergency communication device comprising:
   at least one sensor to detect at least one corresponding emergency condition in a proximity of a corresponding primary wireless emergency communication device and to generate one or more information signals corresponding to a detected at least one emergency condition;
   the at least one sensor is selected from the group consisting of an ionization detector, a temperature detector, a gas detector, a fire detector, a fire type detector, a carbon monoxide detector, a radiation detector and a photoelectric detector, or a combination thereof;
   a memory adapted to store a mobile application having a plurality of processor-executable instructions to determine the presence of at least one emergency condition and to generate multi alert signals and at least one alert message includes an identification of a sender, a location of the detected at least one emergency condition to wirelessly communicate the determined at least one emergency condition; and
   a processor to execute the processor-executable instructions of the mobile application to determine the presence of at least one emergency condition based on the generated one or more information signals from the corresponding at least one sensor of the corresponding primary wireless emergency communication device, and, when the presence of the at least one emergency condition is determined in the proximity of the corresponding primary wireless emergency communication device, to generate the multi alert signals and the at least one alert message includes an identification of a sender, a location of the detected corresponding to the detected at least one emergency condition, and to initiate communication of the generated multi alert signals and the at least one alert message includes an identification of a sender, a location of the detected at least one emergency condition via a wireless communication;

at least one secondary communication device, the at least one secondary communication device adapted to receive the generated multi alert signals and the generated at least one alert message includes an identification of a sender, a location of the detected corresponding to the detected presence of the at least one emergency condition wirelessly communicated from the corresponding primary wireless emergency communication device and to provide an alert of the detected presence of the at least one emergency condition; and at least one primary alert device for producing alerts based on primary multi alert signals, the at least one primary alert device being selected from the group consisting of flashing laser light, an audible alert, tactile alert and an olfactory alert.

9. The emergency detection and alert system according to claim 8, wherein the at least one primary wireless emergency communication device comprises at least one of a mobile communication device and an emergency condition detector, and the emergency condition detector as a primary wireless emergency communication device is selected from the group consisting of an ionization detector, a temperature detector, a gas detector, a fire detector, a fire type detector, a carbon monoxide detector, a radiation detector and a photoelectric detector, or a combination thereof.

10. The emergency detection and alert system according to claim 8, wherein the at least one alert message comprises at least one of a short message service (SMS) message, a Multimedia Messaging Service (MMS) message, a tweet, a text type message, a voicemail or a combination thereof.

11. The emergency detection and alert system according to claim 8, wherein the at least one primary wireless emergency communication device comprises a smartphone.

12. The emergency detection and alert system according to claim 8, wherein the at least one secondary communication device is selected from the group consisting of one or more of a landline, a server, a mobile telephone and an emergency condition detector, and the emergency condition detector comprises at least one of an ionization detector, a temperature detector, a gas detector, a fire detector, a fire type detector, a carbon monoxide detector, a radiation detector, a photoelectric detector or a combination thereof.

13. The emergency detection and alert system according to claim 8, wherein the at least one primary wireless emergency communication device wirelessly communicates the generated at least one alert signal and the generated at least one alert message to at least one secondary communication device located within a predetermined area, distance, location or range relative to a current location of the corresponding primary wireless emergency communication device.

14. A method for detecting and wirelessly communicating an emergency condition, comprising the steps of:

detecting a presence of at least one emergency condition in a proximity of a mobile communication device by at least one sensor associated with the mobile communication device, the at least one sensor being adapted to sense a corresponding at least one emergency condition;

the at least one sensor is selected from the group consisting of an ionization detector, a temperature detector, a gas detector, a fire detector, a fire type detector, a carbon monoxide detector, a radiation detector and a photoelectric detector, or a combination thereof;

selectively generating by the at least one sensor one or more information signals corresponding to the detected at least one emergency condition;

determining the presence of at least one emergency condition by the mobile communication device based on the one or more information signals;

selectively generating by the mobile communication device, when the presence of the at least one emergency condition is determined, multi alert signals and at least one alert message includes an identification of a sender, a location of the detected corresponding to the at least one detected emergency condition;

determining a current location of the mobile communication device;

selectively communicating by the mobile communication device via a wireless communication the generated multi alert signals and the generated at least one alert message includes an identification of a sender, a location of the detected corresponding to the at least one detected emergency condition to at least one secondary communication device located within a predetermined area, distance, location or range relative to the current location of the mobile communication device via a wireless communication and, when present, selectively wirelessly communicating multi alert signals and an alert message includes an identification of a sender, a location of the detected corresponding to the at least one detected emergency condition to one or more predetermined emergency contacts of the mobile communication device; and selectively generating alerts at the mobile communication device, in response to the multi alert signals, the alerts being selected from flashing laser light source, audio sound source, tactile source, and olfactory cue source.

* * * * *